Aug. 12, 1924.  
E. J. BRANDT  
RESILIENT WHEEL  
Filed March 26, 1921

Witness:  
Jas. E. Hutchinson

Inventor  
Edward J. Brandt  
By Milans + Milans  
Attorneys

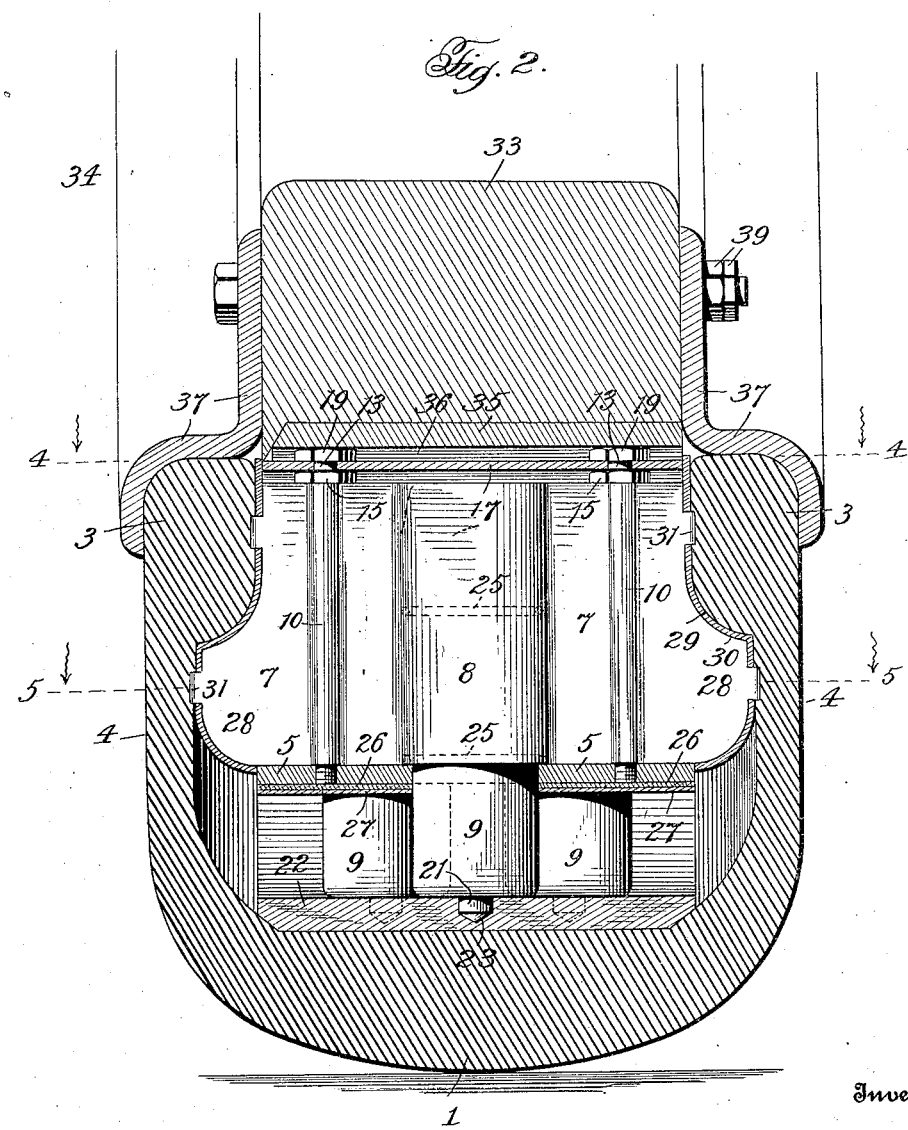

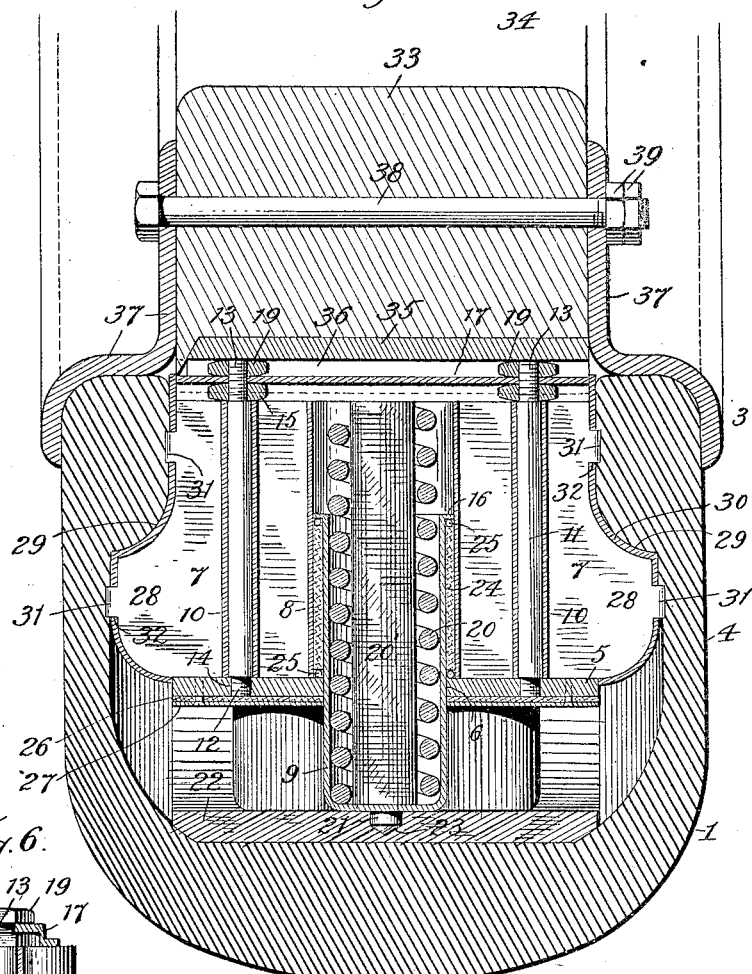
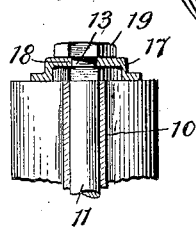

Aug. 12, 1924.  
E. J. BRANDT  
RESILIENT WHEEL  
Filed March 26, 1921   5 Sheets-Sheet 4
1,504,806
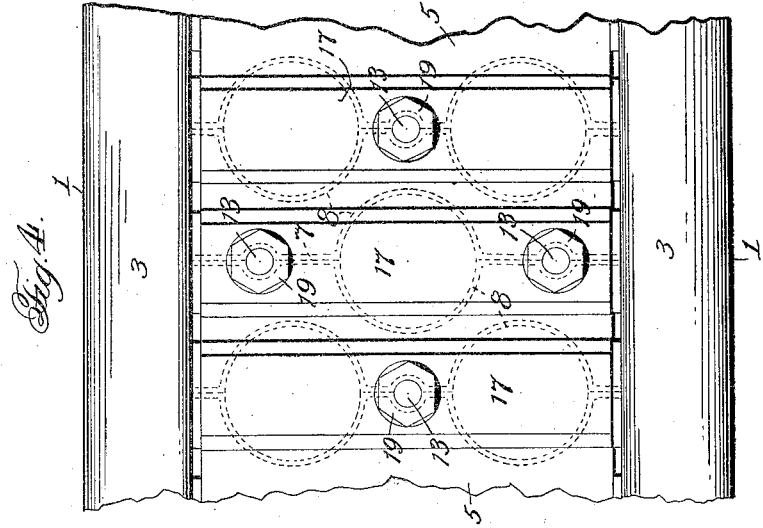
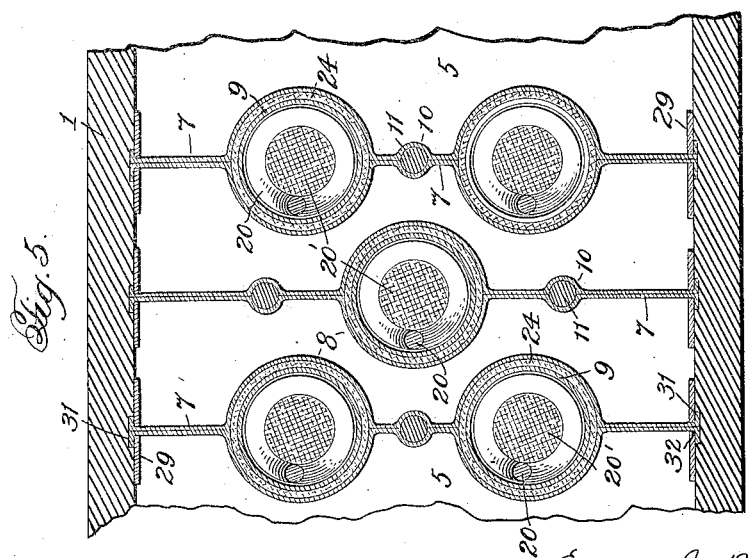
Witness:  
Jas E Hutchinson
Inventor:  
Edward J. Brandt,  
By Milans + Milans  
Attorneys

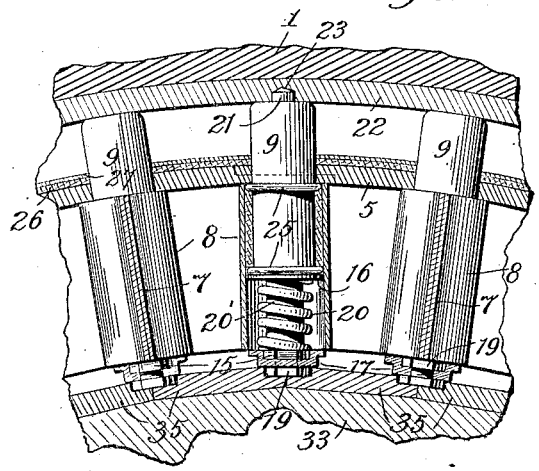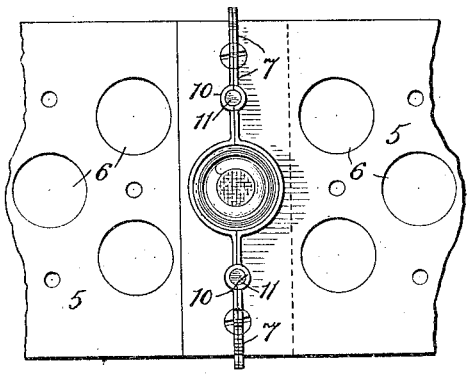

Patented Aug. 12, 1924.

1,504,806

UNITED STATES PATENT OFFICE.

EDWARD J. BRANDT, OF WATERTOWN, WISCONSIN.

RESILIENT WHEEL.

Application filed March 26, 1921. Serial No. 455,710.

*To all whom it may concern:*

Be it known that I, EDWARD J. BRANDT, a citizen of the United States, residing at Watertown, in the county of Jefferson and State of Wisconsin, have invented certain new and useful Improvements in Resilient Wheels, of which the following is a specification, reference being had therein to the accompanying drawing.

This invention pertains to vehicle wheels in which the cushioning element of the structure constitutes a resilient mechanism mounted within the tire shoe or casing and lends the yieldable characteristic to the tire such as would be had in the usual pneumatic tire but avoiding all of the objectionable features common to the use of the latter type.

The principal object of the present invention resides in the novel embodiment of the spring mechanism within the tire shoe or casing, which mechanism when in position presents no obstructions during the attachment of the tire to the felly of the wheel.

Another important feature of the present invention resides in the novel manner of maintaining all of the parts within the casing in their affixed or bolted condition when placed upon the felly of the wheel.

A still further object of the invention resides in the novel manner of bracing the side walls of the casing by a part of the inserted mechanism which prevents the inward collapsing of said side walls when the tire structure is subjected to side strains.

Another object of the present invention is to provide a positive interlock between the projected ends of the plungers and the inner tread portion of the tire shoe or casing. This not only prevents relative circumferential movement, or creeping of the shoe with reference to the interior mechanism but also tends to eliminate the relative lateral movement of the shoe with reference to the inclosed mechanism.

A still further aim of the present invention resides in the novel manner of maintaining all of the movable parts of the resilient mechanism in a lubricated condition so that the same will always function in their highest state of efficiency.

Other objects and aims of the invention, more or less broad than those stated above, together with the advantages inherent, will be in part obvious and in part specifically referred to in the course of the following description of elements, combinations, arrangement of parts and applications of principles constituting the invention, and the scope of protection contemplated will appear from the appended claims.

In the accompanying drawings which form a part of this specification:

Fig. 2 is an enlarged transverse view taken on line 2—2 Figure 1.

Fig. 3 is a view similar to that of Fig. 2 but showing the parts in section.

Fig. 4 is a fragmentary plan view taken on the line 4—4 Fig. 2.

Fig. 5 is a cross sectional view taken on line 5—5 Fig. 2.

Fig. 6 is a detail view more clearly illustrating the type of bridging element which is usual in the present case for maintaining the spring under proper tension.

Fig. 8 is a detail sectional view showing the end portions of the split band and the manner in which they are secured together with a unit mounted over the point of junction.

Fig. 9 is a fragmentary plan view of the split ring showing the unit over the junction point in section.

Fig. 10 is a longitudinal sectional view taken through the junction point of the split band.

Figure 1:
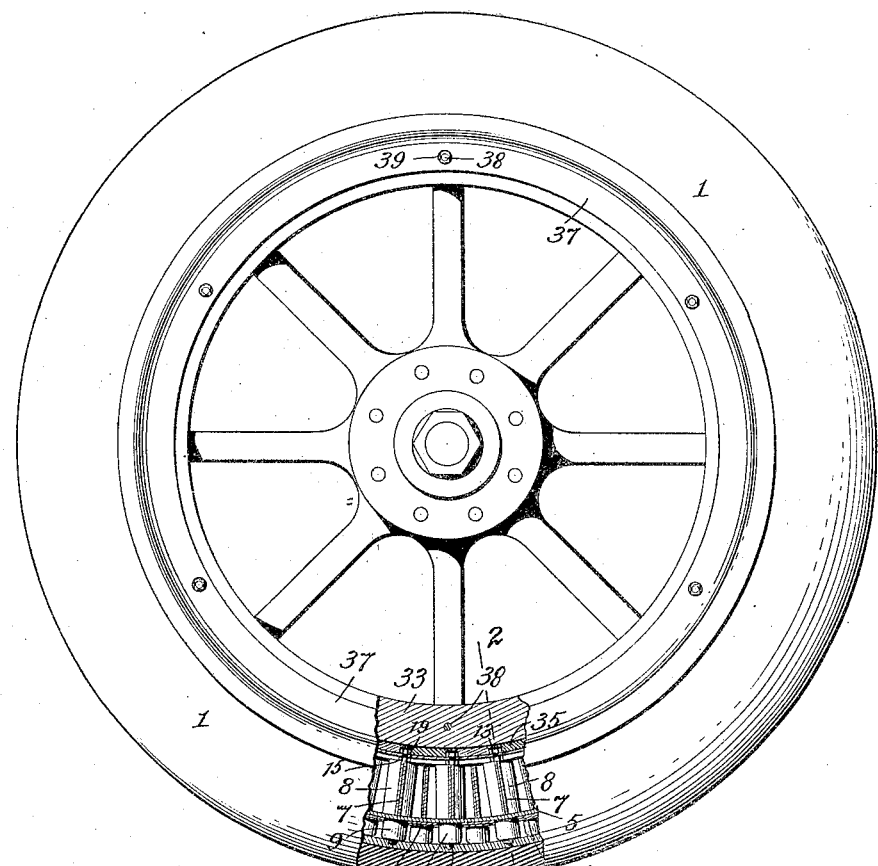
Figure 1 is a side elevation of a complete wheel equipped with the present type of improvement and partly broken away and shown in section to enable a better understanding of the general arrangement of parts.
Figure 7:
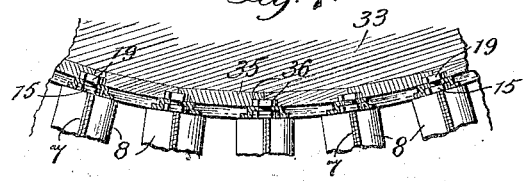
Fig. 7 is a fragmentary view illustrating in a more concise manner the filler blocks which are adapted to be placed within the space and between the wheel felly and the base of the spring mechanism.

In the drawings similar letters of reference indicate like parts throughout the several views in which 1 is a casing of the usual fabricated structure having a tread portion 2 securing edges 3 and straight side walled portions 4. Within the casing 1 there is arranged a metal band 5 which is of a transversely split character thereby enabling the same to be collapsed and inserted into position within the casing 1 and thereafter bolted together as shown in Figure 8. This band is provided with a series of apertures 6 for the purpose of accommodating the yieldable plungers to be hereinafter described.

Upon the inner face of the band there is positioned a series of combined guiding and bracing members generally indicated by the character 7 and as shown in the drawing these members are alternately provided with single and double pockets. Each of the members are practically of the same construction other than the number of pockets so that a detail description of one is thought to be sufficient for the present purposes. These members are of sectional formation being preferably formed of sheet metal and stamped into the general configuration shown in the drawings. The sections of each member are secured together preferably by spot welding or if desired any other conventional type of fastening may be used. The pocketed portions of the members is designated at 8 and is adapted to receive, support and guide a plunger as indicated at 9.

In order that each of the members 7 may be fastened to the band 5, said members are provided with passages 10 for the reception of bolts 11. These bolts 11 are screw threaded at their opposite ends as at 12 and 13, the latter end being longer than that of the end 12 for a purpose as will presently appear. The end 12 of the bolts 11 is adapted to enter screw threaded apertures 14 arranged in the band 5. A tap or nut 15 is turned upon the end 13 of the bolt 11 so that the same contacts with the edge portion of the member 7, thereby effectively securing said member in affixed position on the band 5.

The plunger 9 is preferably of a seamless closed end tube or shell construction, having an outwardly extending flange 16 which is adapted to bear against the inner side wall of each pocket 8. The outer end of each plunger extends through one of the apertures 6 in the band 5 and abuts against the inner face of the tread portion 2 of the tire shoe or casing. The apertures in the band 5 are of such cross sectional diameter as to bear against the side walls of the plunger and thereby concentrically support said plunger within the pockets 8 of the members 7.

Arranged across the inner end of each pocket 8 is a retaining member or cap 17 which is apertured as at 18 to receive the ends 13 of the securing bolts 11. After the caps are placed over the pockets they are held in position by nuts 19 threaded on the end 13 of the bolts 11. Positioned within each pocket 8 and abutting at its outer end against the bottom wall of each plunger 9 and at its inner end against the retaining member or cap 17, is a coiled spring designated 20. This spring is adapted to exert an outward thrust to the plunger and thereby give to the tire 1 its proper amount of resiliency. A saturated wick 20' is enclosed within the spring 20 to keep the convolutions thereof in a lubricated condition.

The contacting terminal of each plunger is provided with an outwardly standing stud or projection 21 which is adapted to enter at least in part into a band 22. This band 22 is preferably composed of leather, but may, if desired, be formed of any other material which might be found to be suitable for the purpose. In order to permit of the easy entry of the stud or projection into the band, the said stud or projection is pointed at its outermost end as at 23. The leather band 22 is secured in any suitable manner to the inner face of the tread portion of the shoe, which prevents relative movement between the leather band and the said shoe. The novel interlock between the plunger ends and the band provides a structure which prevents relative movements either in a circumferential or transverse direction between the casing or shoe and the enclosed resilient mechanism.

Positioned within each pocket between the side wall of the same and the plunger wall is a lubricating pad 24, which pad at its opposite ends abuts against encircling wire rings 25. The lubricating band 24 is of such width as to be placed under a slight compression when the plunger is in its extended or fully projected position. The wire rings 25 are adapted to not only broaden the bearing surface upon which the plunger slides, but by their intimate contact with the saturated pad they remain in a constantly lubricated condition. The rings being positioned against each of the bearing surfaces of the plunger will supply a certain proportion of their carried lubricant to be delivered to the adjacent surface and thereby always maintain these parts in a well oiled condition. Positioned on the exterior face of the band 5 is a second lubricated band 26 composed of felt or other suitable material and superimposed over this band 26 is a thin metal band 27. The band 27 as well as the lubricating band 26 is apertured in keeping with the plunger bearing openings in the band 5, to permit of the passage of the extended plunger ends. The bands 26 and 27 are also transversely divided in keeping with that of band 5 and are secured in affixed position to said band 5 in any approved manner, but preferably attached as shown in Figure 9 of the drawings.

The members 7 being transversely arranged on the band 5 are of such length as to extend beyond the sides of the band as shown at 28. The ends of these extended portions 28 are shaped to conform with the interior side walls of the casing or shoe 3—4 as shown at 29. In order to avoid a sharp contact between the end portions of the members 7 and the side walls of the shoe 3—4, there is positioned on each end portion 29 a bearing plate 30 which is contoured to conform with the inner surface of the side walls of the shoe. These bearing plates 30 are connected with the members 7 by the bendable tongues illustrated as at 31, the tongues being integrally associated with each member and are adapted to be inserted through openings 32 in each of the bearing plates 30. The bearing plates are preferably of such width as to leave a slight space between adjacent bearing plates when the required number of members are assembled on the band 5 which permits portions of the shoe to enter these spaces and thereby additionally prevent relative longitudinal movements of the shoe and the enclosed spring mechanism.

It will be noted that all of the resilient mechanism is inserted within the tire shoe or casing and that no part thereof projects inwardly beyond the inner edges of said shoe. This permits of a tire construction which as a unit may be slipped onto or removed from a felly on the wheel without any interference whatsoever. After the tire is placed in position on the felly 33 of a wheel 34 the space between the felly and the inner surface of the mechanism is filled with filler blocks 35 which have their end portions shouldered or cut away as at 36 to span the protruding ends of the bolts 11. These filler blocks not only form a solid insert between the felly and the resilient mechanism, but by their end portions spanning the bolt ends they also prevent the unloosening of the nuts thereon during the usage of the wheel. The tire is secured in place on the felly of the wheel by annular side rings 37 which are so shaped as to press the securing or beaded ends 3 of the casing or shoe tightly against the contoured face of the bearing plates 30 while the opposite edges of the rings extend onto the side faces of the felly being secured thereto by a series of cross bolts 38 and suitably nutted as at 39.

The manner of assembling the spring mechanism within the tire shoe or casing is as follows:

The metal band 5 and its associated parts are collapsed to permit of the insertion of the band within the tire shoe or casing. After positioning this band within the shoe the end portions thereof are secured together. The individual members 7 are then bolted in position with their pockets in register with the plunger bearing openings in the band 5. The plunger 9 together with the lubricating band 24 and the wire rings 25 are then placed within each pocket. A coiled spring 20 is then inserted within each pocket with its outer end bearing against the inner bottom wall of the plunger. This spring is put under tension and held in this condition by the cap member 17 which in turn is held in position by the nuts 19. The tire or shoe with the enclosed mechanism is then positioned over the felly of the wheel and secured thereto by side clamping rings 37.

By providing the lubricating features at the several points indicated, it will be appreciated that all movable parts of the resilient mechanism will be properly lubricated so that the structure as a whole will operate and be kept in its high state of efficiency.

What I claim as new and desire to secure by Letters Patent is:

1. A tire of the character described comprising a shoe, a multitude of transversely disposed combined pockets and bracing members extending around the shoe therewithin and contacting at their ends with the inner side walls of the shoe, and yieldable plungers in the pockets of said members adapted to bear against the inner face of the tread portion of the shoe, the transverse members being formed and arranged to provide space for the movement of the plungers intermediate of the inner edges of the shoe and said tread portion.

2. A tire of the character described comprising an outer flexible casing, a continuous metal band provided with a series of apertures positioned within the casing, a series of metal pockets rigidly attached to the metal band, and yieldable plungers associated with the pockets and projecting through the apertures in the band and contacting against the inner face of the tread portion of the flexible casing.

3. A tire of the character described comprising an outer flexible casing, a continuous metal band provided with a series of apertures positioned within the casing, means connected to the band and supporting a series of yieldable plungers, the outer ends of said plungers projecting through the apertures in the band and contacting with the inner face of the tread portion of the flexible casing.

4. A tire of the character described comprising a shoe, a band therein provided with a series of openings, said band being positioned away from both the tread and inner edge portions of the shoe, a series of casings rigidly attached to the inner face of the band for supporting yieldable plungers, the outer ends of said plungers projecting through the apertures in the band and contacting with the inner face of the tread portion of the shoe.

5. A tire of the character described comprising a shoe, a band therewithin rigidly supported in position intermediate of the tread portion and securing edge portions of the shoe, said band having bearing portions for yieldable plungers, the yieldable plungers passed therethrough, and combined pocket and rigid lateral bracing members for the shoe formed in sections and occupying adjacent positions around the shoe and therewithin, said combined pocket and bracing members being rigidly secured to said band.

6. A tire of the character described comprising a shoe, a band therewithin rigidly supported in position intermediate of the tread portion and securing edge portions of the shoe, said band having bearing portions for yieldable plungers, the yieldable plungers passed therethrough, and combined pocket and rigid lateral bracing members for the shoe formed in sections and occupying adjacent positions around the shoe and therewithin, said combined pocket and bracing members being rigidly secured to said band, portions of the terminal ends of said bracing members abutting the securing edges of the shoe.

7. A resilient wheel including a metal band peripherally spaced from a felly of the wheel and provided with a series of apertures therein, a series of transversely arranged members associated with said band and having arranged therein yieldable plungers, the outer ends of said plungers projecting through the apertures in the band, and a yieldable casing carried by said transversely arranged members and extending over the projected ends of the plungers.

8. A wheel of the character described comprising a felly, a flexible casing secured to said felly and a resilient mechanism interposed between the felly and the inner wall of the flexible casing, said mechanism including a continuous band peripherally spaced from the felly and provided with a series of apertures, a series of metal pockets interposed between the band and the felly, yieldable plungers carried by the pockets and projecting through the apertures in the band and bearing against the inner wall of the flexible casing.

9. A tire of the character described comprising a shoe, a metal band positioned within and intermediate the tread and securing edge portions of said shoe, said band being provided with a series of apertures, a series of transversely arranged members rigidly secured to said band, yieldable plungers supported by said members and projecting through the apertures in the band, and contacting with the inner face of the tread portion of the shoe.

10. A tire of the character described comprising a shoe, a metal band positioned within the shoe and having therein a plurality of plunger bearing apertures, a series of circumferentially spaced and transversely extending members, each of said members supporting at least one yieldable plunger, the outer ends of the plungers passing through the apertures in the band and bearing against the inner surface of the shoe.

11. A resilient wheel having as a unit removable intact from the wheel, a shoe or casing having internally positioned therein a perforated annular band, a series of circumferentially spaced and transversely disposed pocketed members supported on said band, each of said pocketed members supporting at least one yieldable plunger, the outer ends of the plungers extending through the apertures in the annular band and bearing against the inner tread surface of the tire shoe or casing, and means for securing the shoe or casing in position on the wheel.

12. A tire of the character described comprising a shoe, yieldable plungers therein, a liner interposed between the ends of said plungers and the shoe, and a projecting rigid member carried by each of said plungers adapted to coact with the liner to constitute an interlock preventing relative lateral movement of the plungers and the shoe.

13. A tire of the character described comprising a shoe, yieldable plungers therein, and means interposed between the ends of said plungers and the shoe to constitute an interlock preventing relative lateral movement of the plungers and the shoe, said interposed means comprising a liner for the shoe held against movement independently of the latter and projecting parts on the plunger ends at least partially embedded in said liner.

14. A tire of the character described comprising a shoe, yieldable plungers therein, and means interposed between the ends of said plungers and the shoe to constitute an interlock preventing relative lateral movement of the plungers and the shoe, said interposed means comprising a liner for the shoe held against movement independently of the latter and projecting parts on the plunger ends at least partially embedded in said liner, the plunger ends having broad bearing surfaces adapted to overlie the adjacent face of the liner.

15. A tire of the character described comprising a shoe, a band therein provided with openings to accommodate yieldable plungers, said band being positioned away from both the tread and inner edge portions of the shoe, supporting means for said band, yieldable plungers projecting in opposite directions through the openings in said band, a bearing member on the inner face of the shoe, and interfitting means between the end portions of the plungers and said bearing member.

16. A spring wheel including a felly, a continuous steel band peripherally spaced from the felly and provided with a series of plunger bearing apertures, yieldable plungers mounted on the steel band and extending through the apertures therein, an outer shoe surrounding the plunger ends, a flexible band within the shoe for limiting the outer thrust of the plungers, and penetrating members on the plungers for engagement with the flexible band to prevent relative movements therebetween.

17. A tire of the character described comprising a shoe, yieldable plungers therein, and means for supporting and guiding the plungers and for laterally bracing the shoe, said last mentioned means being of sectional formation, and the plungers and said means being entirely confined within the shoe to present no obstructions when applied to a wheel felly.

18. A tire of the character described comprising a shoe, yieldable plungers therein, and means for supporting and guiding the plungers and for laterally bracing the shoe, the plungers and said means being entirely confined within the shoe to present no obstructions when applied to a wheel felly.

19. A tire of the character described comprising a shoe, a multitude of transversely disposed members having pockets therein arranged within the shoe, a yieldable plunger in each of said pockets adapted to bear against the inner tread surface of the shoe, and the terminal end portions of each member abutting against the side walls of the shoe to laterally brace the same against inward movement.

20. A self-contained tire structure comprising a shoe, yieldable plungers therein, and supporting and guiding means for the plungers constituting in part lateral bracing means for the shoe, said supporting and bracing means being fashioned to bridge the space between the inner securing edges of the shoe and overlie the felly of a wheel when attached.

21. A tire of the character described comprising a shoe, a bearing plate therein for the outer portions of yieldable plungers, yieldable plungers passing therethrough and bearing against the inner face of the tread portion of the shoe, and combined pocket and lateral bracing members for the plungers and shoe comprising a multitude of transverse sections rigidly secured in place and to the band to extend around the tire therewithin, said bracing members having end portions contoured to fit the securing edges of the shoe and arranged to be spaced at adjacent edges in keeping with the radial positioning of the combined pocket and bracing members around the shoe.

22. A tire of the character described comprising a shoe, members arranged transversely of the shoe for supporting a series of yieldable plungers, said plungers bearing against the inner surface of the tread portion of the shoe, and means on the ends of the members for affording a relatively wide bearing surface for the sides of the shoe.

23. A tire of the character described comprising a shoe, members arranged transversely of the shoe for supporting a series of yieldable plungers, said plungers bearing against the inner surface of the tread portion of the shoe, and means on the ends of the members conforming to the contour of the side walls of the shoe for affording a broad bearing surface therefor.

24. A tire of the character described comprising a shoe, members arranged transversely of the shoe for supporting a series of yieldable plungers, said plungers bearing against the inner surface of the tread portion of the shoe, and longitudinally extending plates secured to the ends of the members for affording a relatively broad bearing surface for the sides of the shoe.

25. A tire of the character described comprising a shoe, members arranged transversely of the shoe for supporting a series of yieldable plungers, said plungers bearing against the inner surface of the tread portion of the shoe, and contoured plates secured to the ends of each member to conform with the inner side surface of the shoe for affording a relatively wide bearing surface therefor, the plates on each member being spaced from the plates on the adjacent members.

26. A tire of the character described comprising a shoe, a series of circumferentially spaced and transversely extending members within the shoe, for independently supporting yieldable plungers, said plungers bearing against the inner surface of the tread portion of the shoe, and longitudinally extending means on the ends of the members for affording a relatively wide bearing surface for the sides of the shoe.

27. A tire of the character described comprising a shoe, a band therein provided with a series of openings to accommodate yieldable plungers, plunger guiding and supporting means secured to the inner face of the band, and means associated with the plunger guiding and supporting means for lubricating the movable plungers.

28. A tire of the character described comprising a shoe, a series of members disposed wholly within the shoe and having projecting therefrom yieldable plungers adapted to contact with the inner face of the tread portion of the shoe, and means associated with each of said members to keep the plungers in a lubricated condition.

29. A tire of the character described comprising a shoe, a series of members disposed wholly within the shoe and having projecting therefrom yieldable plungers adapted to contact with the inner face of the tread portion of the shoe, and a lubricated pad carried by each of said members and adapted to have a frictional wiping action on the plunger sides during the reciprocations thereof.

30. A tire of the character described comprising a shoe, a series of members disposed wholly within the shoe each being provided with a plunger projecting outwardly therefrom and contacting with the inner face of the tread portion of the shoe, means for exerting an outward pressure on each of said plungers, and means for keeping the plungers in a lubricated condition.

31. A tire of the character described comprising a shoe, a metal band positioned internally of the shoe and having therethrough a series of plunger receiving apertures, a series of supporting members associated with said band, each of said members supporting at least one yieldable plunger, the outer ends of the plungers projecting through the apertures in the band, and a lubricating band carried by said metal band and adapted to frictionally wipe the side walls of the yieldable plungers.

32. A resilient unit for a spring wheel comprising a metal shell formation having therein a plunger receiving pocket, a plunger positioned within said pocket and projecting beyond one end thereof, a member bridging the opposite end of the pocket, and yieldable means interposed between the said plunger and the bridging member for exerting outward pressure on said plunger.

33. A wheel of the character described comprising a felly, a shoe, yieldable plungers in said shoe, a band occupying a position removed from said felly within said shoe and having openings for the plungers, and means for rigidly securing the band in place, and means interposed between the felly and said securing means to prevent unfastening thereof.

34. A wheel with a felly, a flexible casing, an apertured metal band arranged within the casing between the tread portion thereof and the felly, said band supporting a multitude of inwardly extending capped bridging members, outwardly urged plungers projecting through the apertures in the band and operatively associated with said bridging members, and means for lubricating the plungers, the whole mountable on the wheel felly without obstruction.

35. A wheel with a felly, an apertured metal band peripherally spaced from the felly and supporting a multitude of inwardly extending capped bridging members, said members being arranged on the band in registry with the apertures therein, outwardly urged plungers associated with the bridging members and projecting through the apertures in the band, and a flexible casing housing the metal band and its associated parts, the whole mountable on the wheel felly without obstruction.

36. A wheel with a felly, an apertured metal band peripherally spaced from the felly and supporting a multitude of inwardly extending capped bridging members, said members being arranged on the band in registry with the apertures therein, outwardly urged plungers associated with the bridging members and projecting through the apertures in the band, means for lubricating the plungers, and a flexible casing housing the metal band and its associated parts, the whole mountable on the wheel felly without obstruction.

37. A wheel with a felly, an apertured metal band peripherally spaced from the felly and supporting a multitude of inwardly extending bridging members, said members being arranged on the band in registry with the apertures therein, outwardly urged plungers associated with the bridging members and projecting through the apertures in the band, means confined within each member for lubricating the plungers, and a flexible casing housing the metal band and its associated parts, the whole mountable on the wheel felly without obstruction.

In testimony whereof I hereunto affix my signature in the presence of two witnesses.

EDWARD J. BRANDT.

Witnesses:
  C. E. CYPHERS,
  S. C. NORTHRUP.